United States Patent
Shum (10) Patent No.: US 7,023,667 B2
(45) Date of Patent: Apr. 4, 2006

(54) DUAL STAGE SUSPENSION WITH PZT ACTUATORS ARRANGED TO IMPROVE ACTUATION IN SUSPENSIONS OF SHORT LENGTH

(75) Inventor: Victor Wing Chun Shum, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 290 days.

(21) Appl. No.: 10/265,554

(22) Filed: Oct. 7, 2002

(65) Prior Publication Data

US 2004/0066585 A1 Apr. 8, 2004

(51) Int. Cl.
*G11B 5/56* (2006.01)

(52) U.S. Cl. .................................... 360/294.3
(58) Field of Classification Search .... 360/294.3–294.6
See application file for complete search history.

(56) References Cited

U.S. PATENT DOCUMENTS

| | | | |
|---|---|---|---|
| 5,189,578 A | 2/1993 | Mori et al. | 360/106 |
| 5,521,778 A | 5/1996 | Boutaghou et al. | 360/106 |
| 5,606,472 A | 2/1997 | Akagi et al. | 360/97.01 |
| 5,682,076 A | 10/1997 | Zumeris | 310/323 |
| 5,764,444 A | 6/1998 | Imamura et al. | 360/109 |
| 5,898,544 A | 4/1999 | Krinke et al. | 360/104 |
| 6,025,975 A | 2/2000 | Fard et al. | 360/109 |
| 6,046,888 A | 4/2000 | Krinke et al. | 360/104 |
| 6,052,251 A | 4/2000 | Mohajerani et al. | 360/78.05 |
| 6,069,771 A | 5/2000 | Boutaghou et al. | 360/104 |
| 6,108,175 A | 8/2000 | Hawwa et al. | 360/294.4 |
| 6,157,522 A | 12/2000 | Murphy et al. | 360/294.6 |
| 6,166,890 A | 12/2000 | Stefansky et al. | 360/294.4 |
| 6,188,548 B1 | 2/2001 | Khan et al. | 360/294.4 |
| 6,201,668 B1 | 3/2001 | Murphy | 360/294.4 |
| 6,239,953 B1 * | 5/2001 | Mei | 360/294.6 |
| 6,515,834 B1 * | 2/2003 | Murphy | 360/294.4 |

FOREIGN PATENT DOCUMENTS

JP 2000-182341 6/2000

OTHER PUBLICATIONS

"Dual Stage Actuator for High Speed & High TPI", NHK Spring Co., Ltd. (Sep. 2000).

* cited by examiner

*Primary Examiner*—A. J. Heinz
(74) *Attorney, Agent, or Firm*—Walter W. Duft (57) ABSTRACT

A suspension for a disk drive includes a mount plate adapted to mount to a primary actuator, a functional end portion adapted to carry a slider, and a hinge disposed between the mount plate and the functional end portion. A mounting configuration is provided on the mount plate for mounting the suspension to the primary actuator. A pair of secondary actuators are mounted in longitudinally overlapping relationship with the mounting configuration so as to minimize the impact of the secondary actuators on suspension length. The secondary actuators are operatively connected to the hinge for producing sway displacement of the slider.

28 Claims, 11 Drawing Sheets

DUAL STAGE SUSPENSION WITH PZT ACTUATORS ARRANGED TO IMPROVE ACTUATION IN SUSPENSIONS OF SHORT LENGTH

BACKGROUND OF THE INVENTION

1. Field of the Invention

The present invention relates to data storage apparatus for magnetically reading and writing information on data storage media. More particularly, the invention concerns suspensions designed to carry read/write heads in magnetic disk drive storage devices.

2. Description of the Prior Art

By way of background, a read/write transducer in a magnetic disk drive storage device ("disk drive") is typically incorporated on an air bearing slider that is designed to fly closely above the surface of a spinning magnetic disk medium during drive operation. The slider is mounted to the free end of a suspension that in turn is cantilevered from the arm of a rotary actuator mounted on a stationary pivot shaft. The suspension typically has a mount plate end that attaches to the actuator arm, a bend-compliant hinge connected to the mount plate, and a load beam that extends from the hinge to the free end of the suspension where the transducer-carrying slider is mounted on a flexure that allows it to gimbal. The actuator is driven by a rotary voice coil motor that, when energized, causes the actuator to rotate and thereby sweep the actuator arm and its attached suspension across the disk surface. By controlling the rotational movement of the actuator via the voice coil motor, the read/write transducer can be selectively positioned over the surface of the magnetic disk medium, allowing it to read and write data in a series of concentric tracks.

Recent years have seen an increase in TPI (Tracks Per Inch) recording density requirements in order to meet the demand for increased data storage capacity. This has necessitated finer track positioning resolution than is possible using voice coil motor control alone. One solution to the foregoing problem has been to mount a pair of small piezoelectric transducer (PZT) actuators to the suspension. The PZT actuators are usually oriented in a spaced parallel arrangement, but angled configurations have also been proposed. When energized, the PZT actuators impart small sway (i.e., across-track) displacements to the suspension. Each sway displacement causes the read/write head mounted at the free end of the suspension to move several tracks in either direction from its nominal position, depending on the polarity of the energy that drives the PZT actuators.

Figure 1:
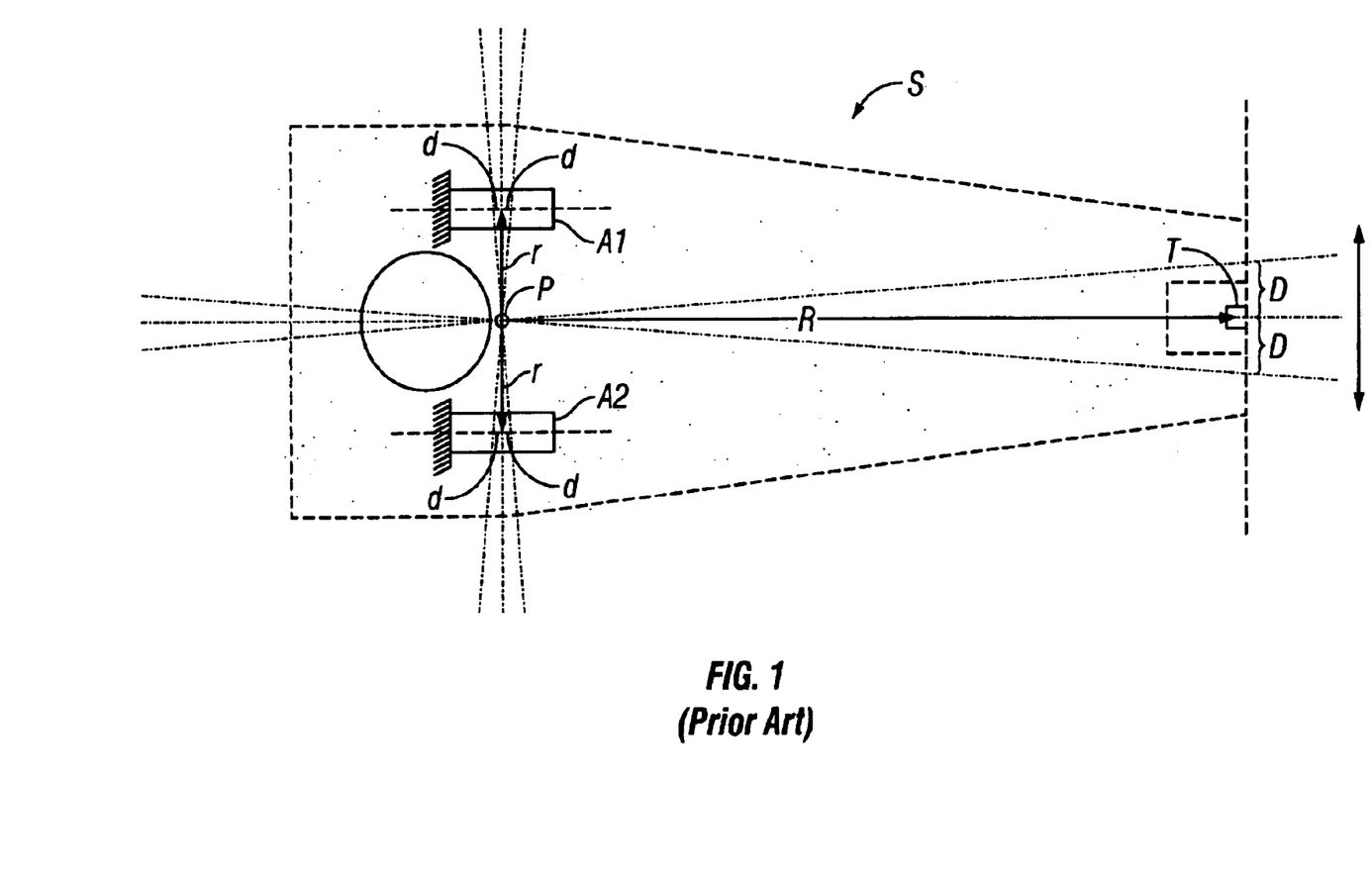
FIG. 1 is a diagrammatic plan view showing the geometry of an idealized dual stage suspension and its motion when actuated by secondary actuators.

FIG. 1 is illustrative. It shows a suspension S that has two PZT actuators A1 and A2. The actuators A1 and A2 are spaced from each other by a distance of 2*r, where "r" is the distance from the displaceable end of each actuator (the other end being relatively statically fixed) to a pivot point "P" about which the suspension pivots due to PZT actuation. A distance "R" exists between a read/write transducer T and the pivot point P. When the displaceable ends of the actuators are respectively displaced by a positive and negative stroke length of magnitude "d" (i.e., one actuator is lengthened while the other is shortened), a sway stroke offset "D" will be produced at the read/write transducer T.

The PZT actuators thus provide a second stage of suspension actuation that enhances the primary actuation provided by the voice coil motor. For this reason, suspensions having PZT actuators may be referred to as "dual stage" (or "two stage") suspensions. Very fine track positioning resolution can be obtained with a dual stage suspension. Moreover, because the response time of the secondary stage PZT actuators is generally much less than that of the primary stage voice coil motor, the seek and settle latency associated with data storage and retrieval operations can be reduced in situations where the read/write head only needs to move a few (e.g., 1–4) tracks at a time.

The above-described PZT actuators are sometimes referred to as "microactuators." However, the term "milliactuator" is perhaps more appropriate in order to distinguish such elements from another type of PZT (or electrostatic) actuator that is mounted directly under, or near, the slider. This latter type of actuator, known as a "microactuator," has smaller movement (e.g., 1–2 tracks) than the "milliactuator" elements described above. However, due to their location under or near the slider, microactuators have better dynamic characteristics than milliactuators, which are located near the suspension hinge. The present invention concerns PZT actuators of the milliactuator type that are mounted in proximity to the suspension hinge.

Current disk drive suspensions tend to be about 11–18 mm in length. With the trend toward ever increasing data densities, future designs will see suspension lengths of 11 mm or less. This presents a problem relative to prior art milliactuator systems. Because a disk drive suspension is normally swage-mounted to its associated actuator arm, it usually has a relatively large swage spud at its mount plate end to be connected to a swage hole in the actuator arm. In order to maintain adequate clearance with respect to the swage spud while providing the required sway stroke, PZT actuators are typically spaced longitudinally from the swage spud and mounted on an elongated portion of the suspension mount plate. It will be appreciated that accommodating the actuators in this fashion is contrary to the goal of reducing suspension length. Although some manufacturers have proposed artificial shortening of the suspension's functional end (e.g., load beam) as a solution to this problem, this approach impacts other suspension properties such as dynamic characteristics.

Accordingly, a need exists for a suspension design that facilitates the effective use of PZT actuators to increase track positioning resolution in disk drive suspensions of reduced length. Preferably, this design will not increase the mass and inertia of the suspension and will avoid introducing undesirable dynamic characteristics such as excessive gain in the suspension's torsion and sway modes under excitation forces such as air flow and actuator seek motion.

SUMMARY OF THE INVENTION

The foregoing problems are solved and an advance in the art is obtained by an improved dual stage disk drive suspension. The suspension includes a mount plate adapted to mount to a primary actuator, a functional end portion adapted to carry a slider, and a hinge disposed between the mount plate and the functional end portion. A mounting configuration is provided on the mount plate for mounting the suspension to the primary actuator. A pair of secondary actuators are arranged on the suspension in longitudinally overlapping relationship with the mounting configuration so as to minimize the impact of the secondary actuators on suspension length. The secondary actuators are operatively connected to the hinge for producing sway displacement of the slider. They may be either parallel or non-parallel to each other and they may overlap the mounting configuration by any desired amount. The foregoing suspension geometry is ideally suited for suspensions of short length, including suspensions having an overall length of about 10–12.5 millimeters or less.

In preferred embodiments of the invention, the hinge defines a pair of laterally spaced hinge beams extending between the mount plate and the functional end portion. The mount plate is configured to provide a pair of actuator receiving gaps in which the secondary actuators are situated. Each actuator receiving gap is defined at one end by a static actuator support region of the mount plate and at the other end by a rotational element adapted to rotate in response to stroke displacements of one of the secondary actuators. Each of the rotational elements is operatively connected to one of the hinge beams. Optional stiffener arms may be provided to control and adjust rotational stiffness of the rotational elements. The laterally spaced hinge beams and the optional stiffener arms can be formed from a hinge plate member that is supported in overlapping relationship with the mount plate. The actuator receiving gaps are preferably configured so that the secondary actuators are recessed to provide actuator component protection.

To provide electrical connections to the slider, the suspension further includes a flexure assembly having electrical lead elements that extend from behind the mount plate (i.e., from the primary actuator) to the slider. To prevent unwanted force imbalances as the hinge is deflected by stroke displacements of the secondary actuators, or by other forces such as air flow or primary actuator seek motion, the electrical lead elements are preferably aligned along a central longitudinal axis of the suspension in the area where they span the hinge. The electrical lead elements are carried on a flexure lead support structure that extends from behind the mount plate to the slider. In areas where the lead support structure is subject to bending as a result of sway displacement of the suspension, the lead support structure may be provided with a bend compliant configuration to reduce resistance to such bending. Similarly, in areas where the lead support structure is subject to axial elongation and contraction as a result of stroke displacement of the secondary actuators, the lead support structure may be provided with an adjustable length configuration to reduce resistance to such axial displacements.

The invention further contemplates a disk drive that incorporates a dual stage suspension as summarized above.

BRIEF DESCRIPTION OF THE DRAWING

The foregoing and other features and advantages of the invention will be apparent from the following more particular description of preferred embodiments of the invention, as illustrated in the accompanying Drawings, in which.

DETAILED DESCRIPTION OF PREFERRED EMBODIMENTS

Figure 2:
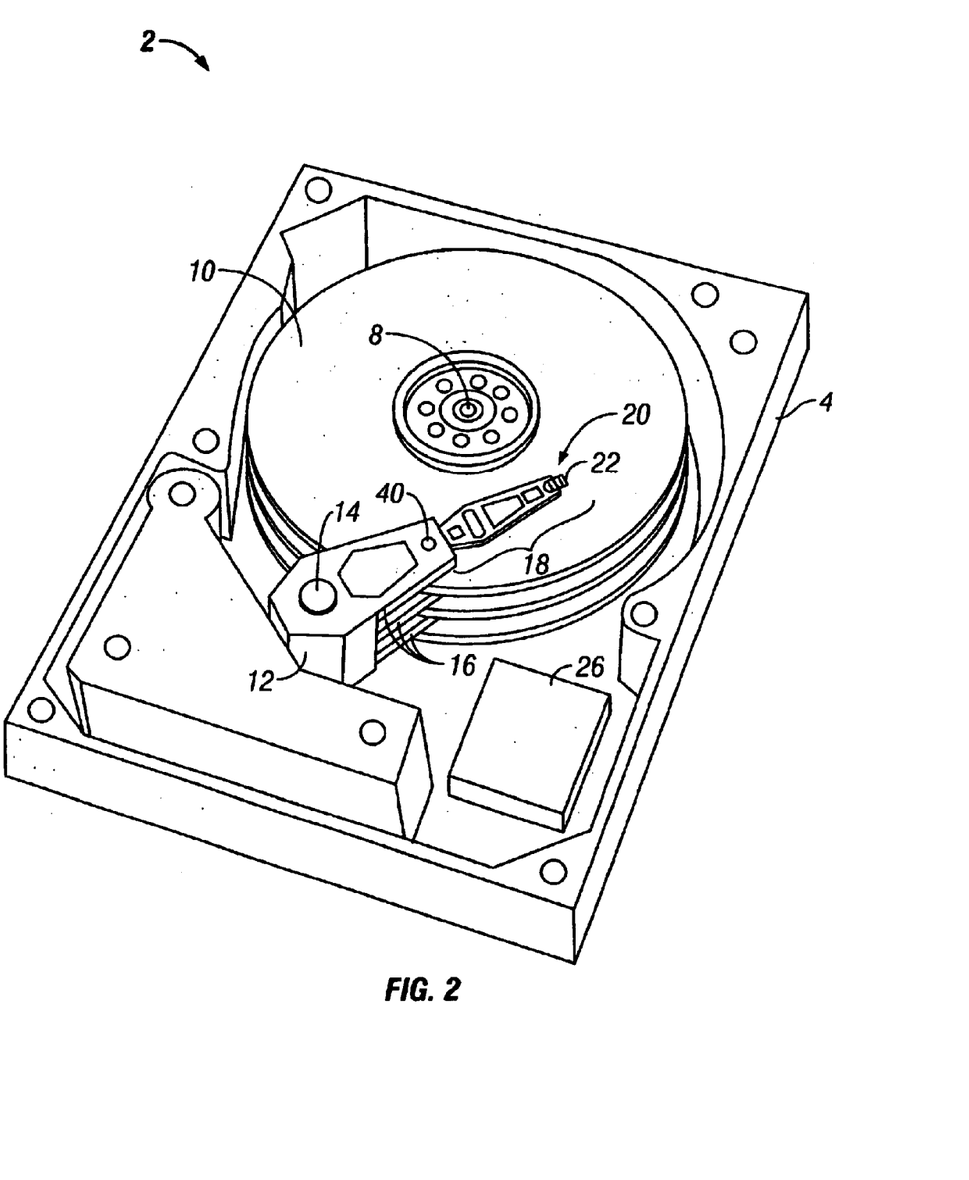
FIG. 2 is an interior perspective view of a magnetic disk drive that incorporates a dual stage suspension in accordance with the invention.
Figure 3:
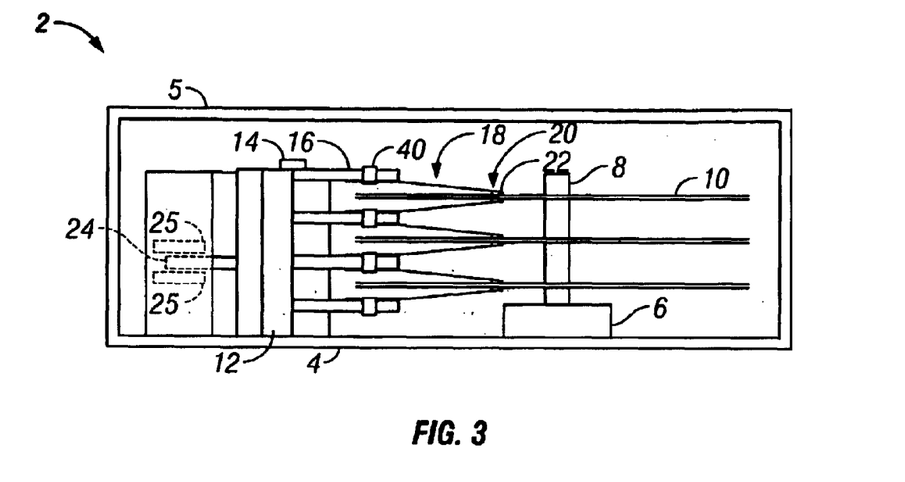
FIG. 3 is a simplified vertical sectional view of the magnetic disk drive of FIG. 2.
Figure 4:
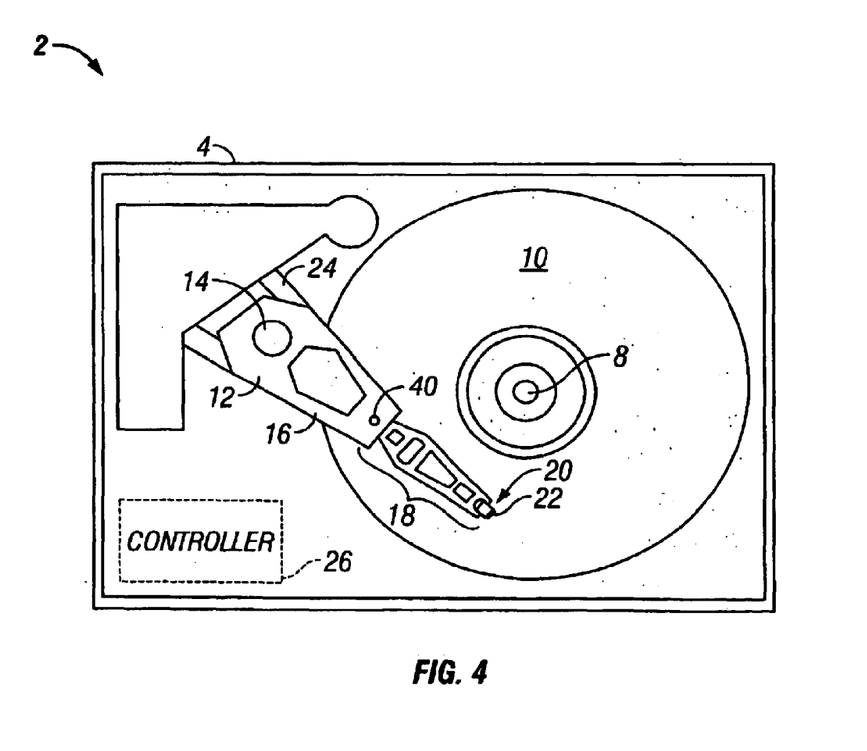
FIG. 4 is a simplified horizontal sectional view of the disk drive of FIG. 2.

Turning now to the figures, wherein like reference numerals represent like elements in all of the several views, FIGS. 2–4 illustrate an exemplary disk drive 2 that has been manufactured in accordance with the invention. The disk drive 2 conventionally includes a base casting 4 made from cast aluminum or other suitable material. A cover 5 is removably mounted thereto via a hermetic seal (not shown). The base casting 4 mounts a conventional spindle drive motor 6 having an associated drive spindle 8. The drive spindle 8 carries a stacked array of disks 10 for high speed rotation therewith. The disks 10 are made from a suitable material of a type usually found in magnetic disk drive assemblies. In particular, the disks 10 may be formed from an aluminum or glass substrate with appropriate coatings being applied thereto such that at least one, and preferably both, of the upper and lower surfaces of the disks are magnetically encodable and aerodynamically configured for high speed interaction with a read/write transducer (described below).

Data access to the disk 10 is achieved with the aid of an actuator 12 that is mounted for rotation about a stationary pivot shaft 14. The actuator 12 includes actuator arms 16 that each carry one or two PZT actuated suspensions 18. Each suspension 18 supports an air bearing slider 20 having a read/write transducer 22 formed on the end face thereof. The transducer 22 (sometimes referred to as a "transducing head") is an integrated device that includes a magnetic write element (sometimes referred to as a "write head") and a magnetic read element (sometimes referred to as a "read head"). The write element conventionally includes an inductive yoke structure and the read element conventionally includes any of various species of magnetoresistive sensor.

There is preferably one transducer 22 associated with each of the upper and lower surfaces of the disks 10 (see FIG. 3), such that each disk surface is available for data storage. The transducers 22 are positionable to read and write data anywhere on the disk surfaces by pivoting the actuator 12 about the stationary pivot shaft 14. The pivotal motion of the actuator 12 causes the actuator arms 16 to sweep the suspensions 18 across the disk surfaces. This in turn causes the sliders 20 with their mounted transducers 22 to move generally radially from one concentric data track to another. To facilitate pivotal movement of the actuator 12, the actuator conventionally includes a voice coil motor winding 24 (see FIGS. 3 and 4) that is driven by a pair of motor magnets 25 (see FIG. 3).

When the disk drive 2 is powered on, the disks 10 will spin up to a desired rotational speed, such as 7400 rpm, 10,000 rpm or higher. This causes an interfacial air bearing force to develop between the disk surfaces and the sliders 20. The air bearing force is counteracted by the opposing gram loading force provided by the suspensions 18. If the suspensions 18 are properly fabricated, their gram loading force will enable the transducers 22 to fly very closely above the disk surfaces, allowing high density data recording.

Data recorded on the disks 10 is read by the read head elements of the transducers 22 and processed into readback signals by signal amplification and processing circuitry (not shown) that is conventionally located on the actuator arms 16. The readback signals carry either customer data or transducer position control information depending on whether the read head element is reading from a customer data region or a servo region. In either case, such signals are sent to the disk drive controller, shown diagrammatically at 26, for appropriate processing. The controller 26 also generates write data signals during data write operations. The write data signals are delivered via circuitry carried by the actuator arms 16 and suspensions 18 to the write head elements of the transducers 22 for writing customer data onto the disks 10.

It will be appreciated that the foregoing description of the disk drive 2 is exemplary in nature, and that many other design configurations would be possible while still utilizing the suspension load beam of the invention.

In order to increase the disk drive's track positioning resolution beyond that which can be obtained from the voice coil motor winding 24 and the motor magnets 25 (see FIG. 3), each of the suspensions 18 is constructed to implement dual stage actuation, with the actuator 12 acting as the primary stage actuator and with secondary PZT actuators being incorporated on the suspensions to provide secondary stage actuation. The remaining discussion is directed to four exemplary embodiments of such suspensions in order to further illustrate the principles of the invention.

A. First Exemplary Suspension Embodiment

Figure 5:
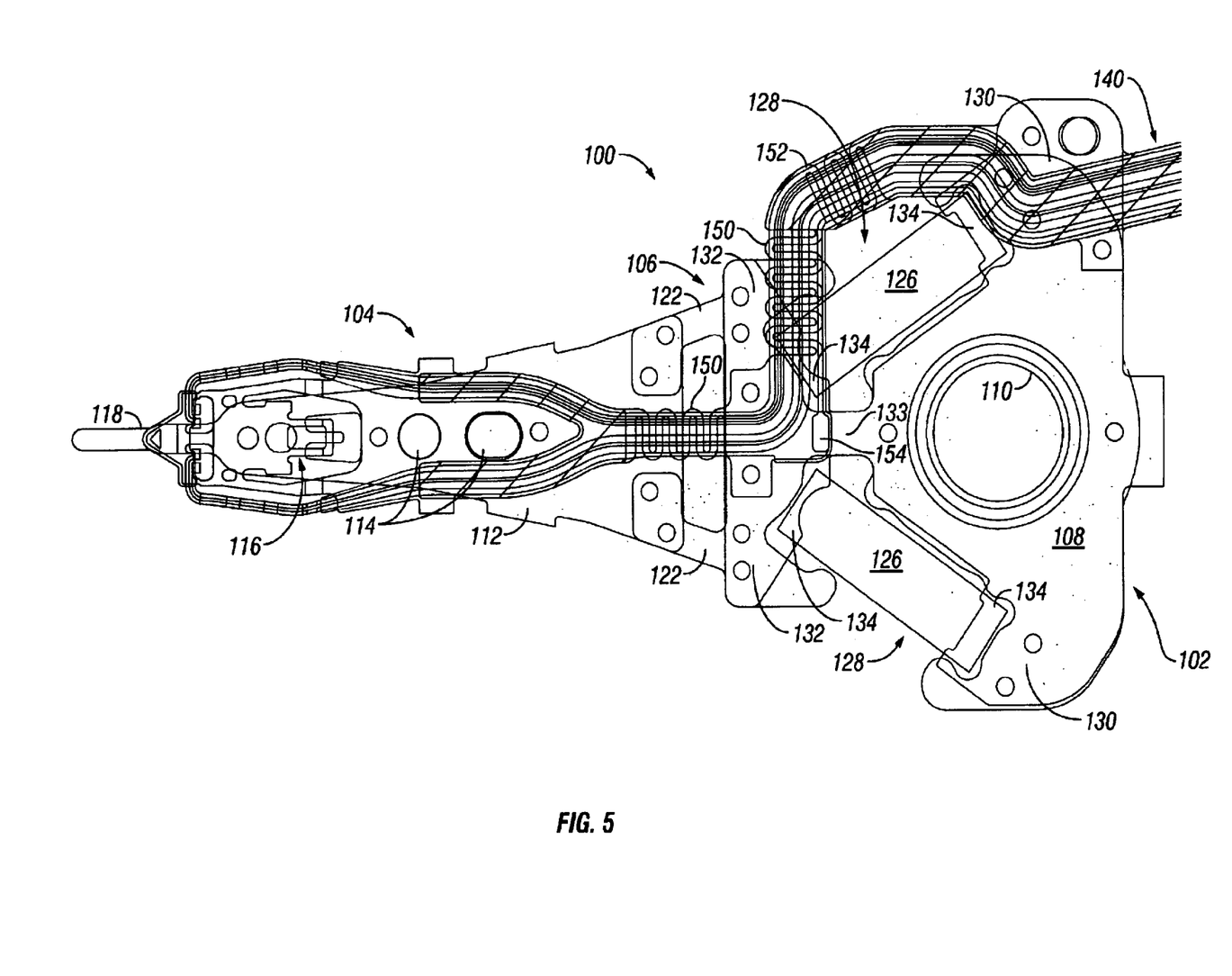
FIG. 5 is a plan view of a dual stage suspension assembly constructed in accordance with a first embodiment of the invention.
Figure 6:
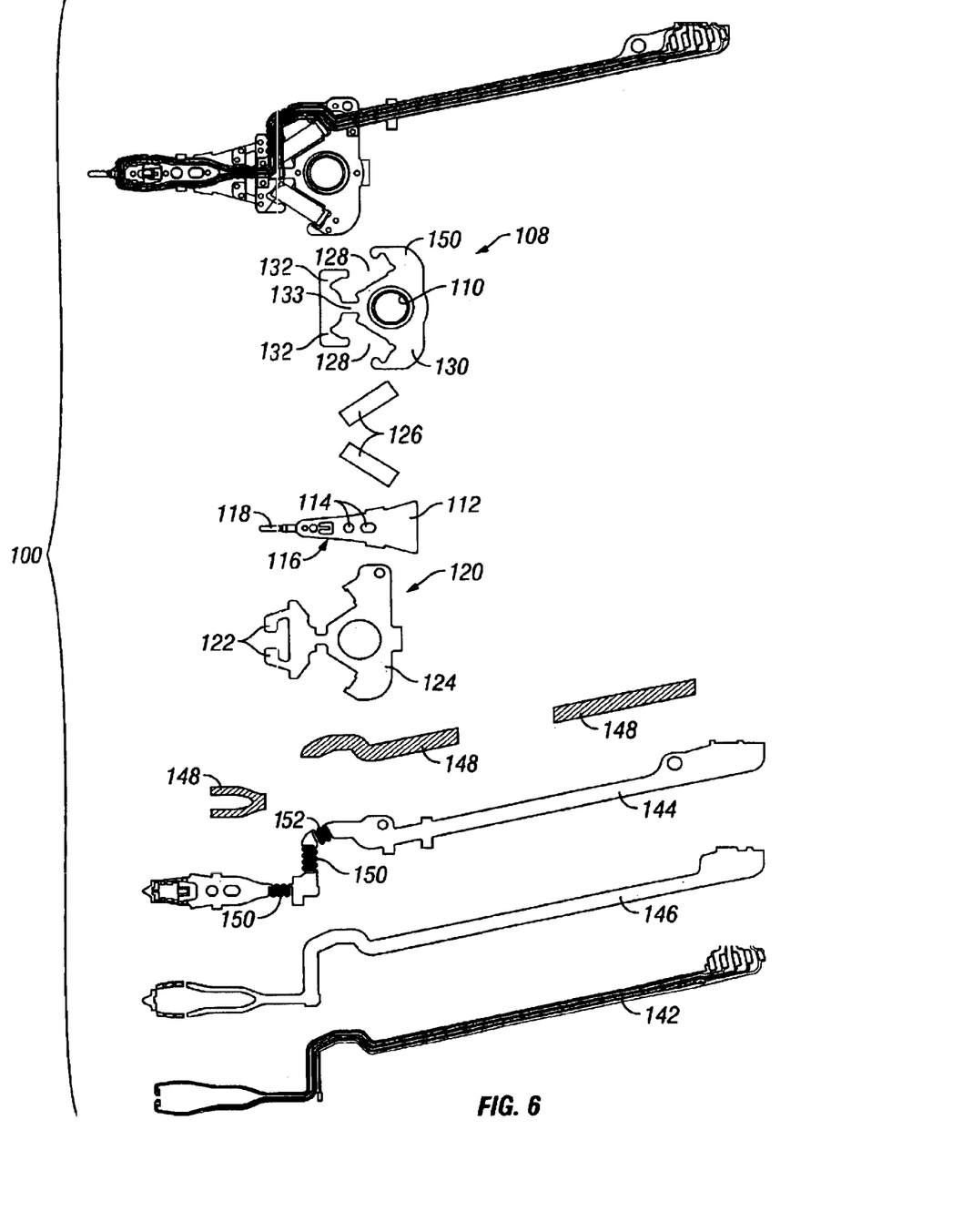
FIG. 6 is an exploded view showing components of the dual stage suspension assembly of FIG. 5.

Turning now to FIGS. 5 and 6, a suspension 100 is constructed in accordance with a first exemplary embodiment of the invention. As best shown in FIG. 5, the principal components of the suspension 100 are a mount plate 102 adapted to mount to the actuator 12 (the primary actuator), a functional end portion 104 adapted to carry a slider (such as one of the sliders 20 of FIGS. 3 and 4), and a hinge 106 disposed between the mount plate 102 and the functional end portion 104. Although the foregoing components can be attached to one another in various ways, conventional welding is preferred. FIG. 5 illustrates a number of weld points (shown as small circles in FIG. 5) that may be used to provide the required connections.

As best shown in FIG. 6, the mount plate 102 of the present embodiment is formed as a single mount plate sheet member 108 whose strength is enhanced by a stiffener portion of a hinge member (see below) used to form the hinge 106. The mount plate member 108 can be made from any suitable material, with roll-formed stainless steel being preferred. A swage spud 110 is formed in the mount plate member 108 to provide a mounting configuration for mounting the suspension 100 to the primary actuator 12. The swage spud 110 is adapted to be received in a swage hole (not shown) to form a conventional swage connection between the suspension 100 and the primary actuator 12. Other mounting configurations could also be used.

The functional end portion 104 of the present embodiment is conventionally designed to act as a relatively stiff load bearing structure that supports a flexure assembly carrying a slider and a system of electrical lead elements (see below). As best shown in FIG. 6, the functional end portion 104 is formed from a load beam sheet member 112 that can be made using any suitable material, with roll-formed stainless steel being preferred. As persons skill in the art will appreciate, the functional end portion 104 can be configured with various conventional design features. These include etched apertures 114 for tooling and assembly purposes, flexure-gimbal features (load dome) 116 for supporting the flexure assembly and slider, and a load/unload tab 118.

The hinge 106 interconnects the functional end portion 104 and the mount plate 102. Its purpose is to provide a compliant bending section that allows the functional end portion 104 to load a slider against the usual air bearing that develops between the slider and an underlying data storage medium. As best shown in FIG. 6, the hinge 106 of the present embodiment is formed from a hinge plate member 120 that can be made using any suitable material, with very thin gauge stainless steel being preferred. The hinge member 120 is configured to define a pair of laterally spaced hinge beams 122 that span the area between the mount plate 102 and the functional end portion 104. Each hinge beam 122 protrudes from a much larger stiffener portion 124 of the hinge member 120 that extends in overlapping relationship with the mount plate member 108 (i.e., below it in FIGS. 5 and 6) and has a shape that is in substantial correspondence therewith.

Two PZT actuators 126 are operatively connected to the mount plate 102. They may be constructed in conventional fashion as using single or multilayer ceramic piezoelectric actuator materials. Preferably, the actuators 126 are of opposite polarization in order to simplify the electrical connections thereto. For example, in a preferred electrical connection arrangement, one side of each actuator 126 is shorted to the mount plate 102 using conductive epoxy or the like while the other side is wire stitched to an extra power lead (see below) carried on the flexure assembly. When a voltage differential is applied, one of the actuators 126 is polarized to elongate longitudinally while the other actuator is designed to contract longitudinally. The elongation/contraction distance represents the actuator stroke length.

In order to minimize the impact of the actuators 126 on the length of the suspension 100, the actuators are arranged in longitudinally overlapping relationship with the swage spud 110. As used herein, the term "longitudinally" refers to the longitudinal dimension of the suspension 100 extending from the mount plate 102 through the functional end portion 104. The actuators 126 may be either parallel or non-parallel to each other and they may longitudinally overlap the swage spud 110 by any desired amount. FIG. 5 shows a non-parallel, partially overlapping arrangement in which the actuators 126 converge from rearward locations that are laterally adjacent opposite sides of the swage spud 110 to forward locations proximate each hinge beam 122. It will be appreciated that the foregoing suspension geometry is ideally suited for suspensions of short length, including suspensions having an overall length of about 10–12.5 millimeters or less.

To support, protect and align the actuators 126, the mount plate member 108 is configured to provide a pair of actuator receiving gaps 128 in which the actuators 126 are situated. The actuator receiving gaps 128 are each defined at one end by a static actuator support region 130 and at the other end by a rotational element 132 adapted to rotate in response to stroke displacements of one of the actuators 126. The static support region 130 is designed to provide substantially immovable anchoring points for the actuators 126. The rotational elements 132 are designed to offer minimal resistance to actuator stroke. Each rotational element 132 is operatively connected to one of the hinge beams 122 (i.e., via welds) and pivots about an area of attachment to a central longitudinal mount plate beam element 133 that interconnects the rotational elements to the static support region 130. Collectively, the central beam element 133 and the rotational elements 132 form a "T"-shaped structure when the mount plate is viewed from the right side in FIGS. 5 and 6. To magnify the actuator stroke advantage, the actuators 126 preferably attach to the rotational elements 132 between their point of attachment to the hinge beams 122 and the central beam element 133. This configuration is best shown in FIG. 5.

The actuator receiving gaps 128 are preferably configured so that the actuators 126 are recessed and do not extend above an upper surface of the mount plate member 108, thus providing actuator component protection. This is accomplished by providing actuator support tabs 134 at each end of the actuator receiving gaps 128 whose upper surface is co-extensive with a lower surface of the mount plate member 108. The thickness of the mount plate sheet member 108 is then selected to be greater than or equal to the thickness of the actuators 126. As best shown in FIG. 5, the actuator support tabs 134 are preferably provided by portions of the hinge stiffener 124 that extend into the actuator receiving gaps 128 so as to be situated under the ends of the actuators 126. It is here that the actuators 126 may be attached to the mount plate 102, as by non-conductive adhesive bonding or the like.

To provide electrical connections to a slider carried by the functional end portion 104, the suspension 100 further includes a flexure assembly 140 having electrical lead elements 142 that extend from behind the mount plate 102 to the slider. The lead elements 142 can be made of copper or any other suitable conductor. To prevent unwanted force imbalances as the hinge 106 is deflected by stroke displacements of the actuators 126, or the flexure assembly 140 is deflected by air flow, the electrical lead elements 142 are preferably aligned along a central longitudinal axis of the suspension 102 in the area where they span the hinge 106. As best shown in FIG. 6, the electrical lead elements are carried on a flexure lead support structure 144 made from stainless steel or the like that extends from behind the mount plate 102 to the slider carrying region of the functional end portion 104. An insulative layer 146 made from a suitable polymer such as polyimide is disposed between the lead elements 142 and the lead support structure 144. A cover layer 148 made from a suitable polymer such as epoxy is placed over the electrical lead elements 142 for protecting the electrical lead elements and to enhance noise rejection.

In areas 150 where the lead support structure 144 is subject to bending as a result of sway displacement of the functional end 104, the lead support structure is provided with a meandering or serpentine bend compliant configuration to reduce resistance to such bending. If further reduction of bending stiffness is required, the serpentine configuration of the lead support structure can be broken to provide small islands of support material. The conductor material forming the lead elements can be formed out-of-plane at the same time to provide substantially lower bending stiffness. Similarly, in an area 152 where the lead support structure 144 is subject to axial elongation and contraction as a result of stroke displacement of the actuators 126, the lead support structure may be provided with a meandering or serpentine adjustable length configuration (or a broken configuration per the above) to reduce resistance to such actuator stroke displacement.

It will also be seen that one of the electrical lead elements 142 connects to an electrical 110 terminal pad 154 located on the central beam element 133. Wire stichings are used to connect the terminal pad 154 to each actuator 126. This has the advantage of increasing the panel density of the flexure laminate and provides a symmetrical lead geometry. However, direct placement of copper conductor trace elements over the actuators 126 for terminations is also possible.

B. Second Exemplary Suspension Embodiment

Figure 7:
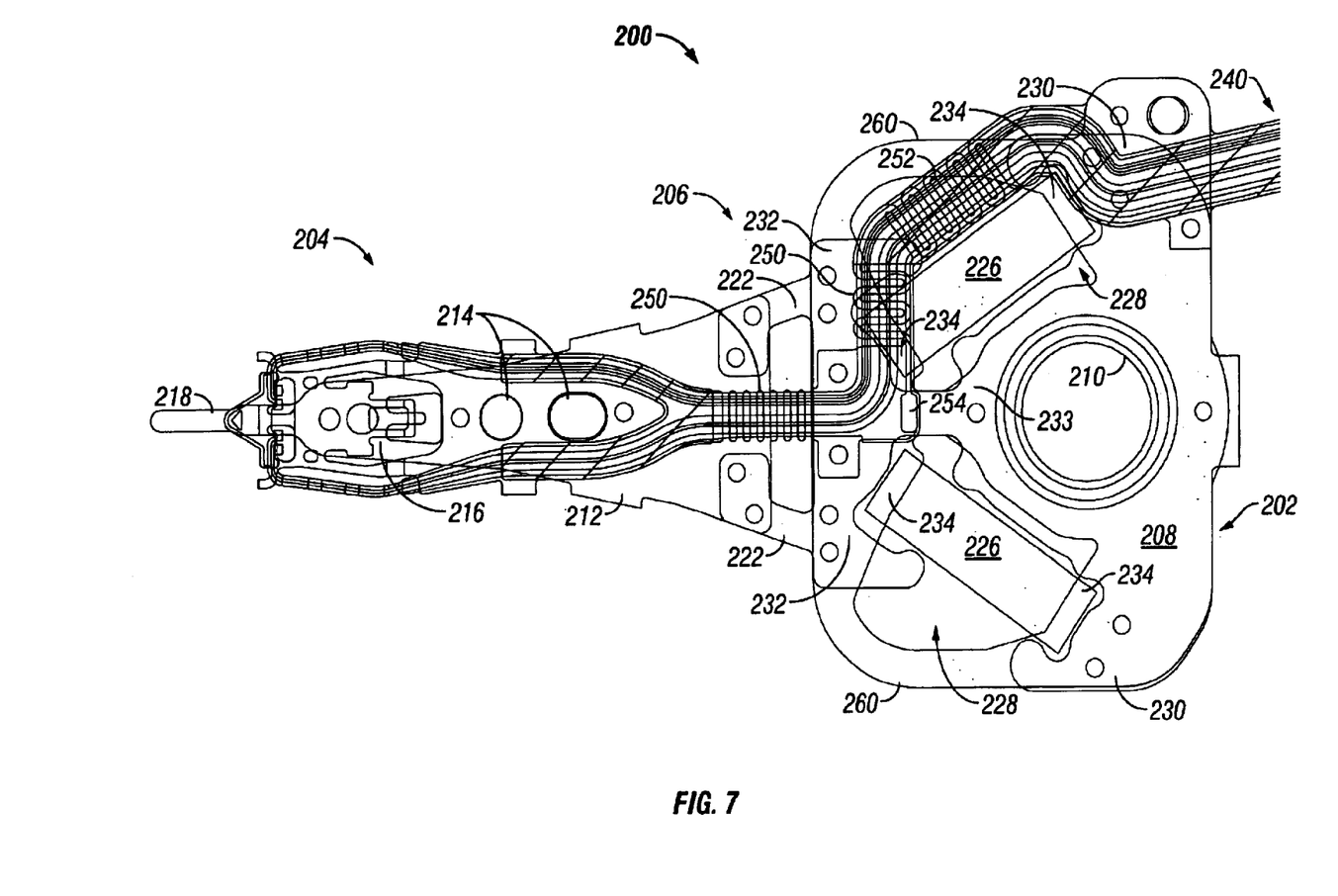
FIG. 7 is a plan view of a dual stage suspension assembly constructed in accordance with a second embodiment of the invention.
Figure 8:
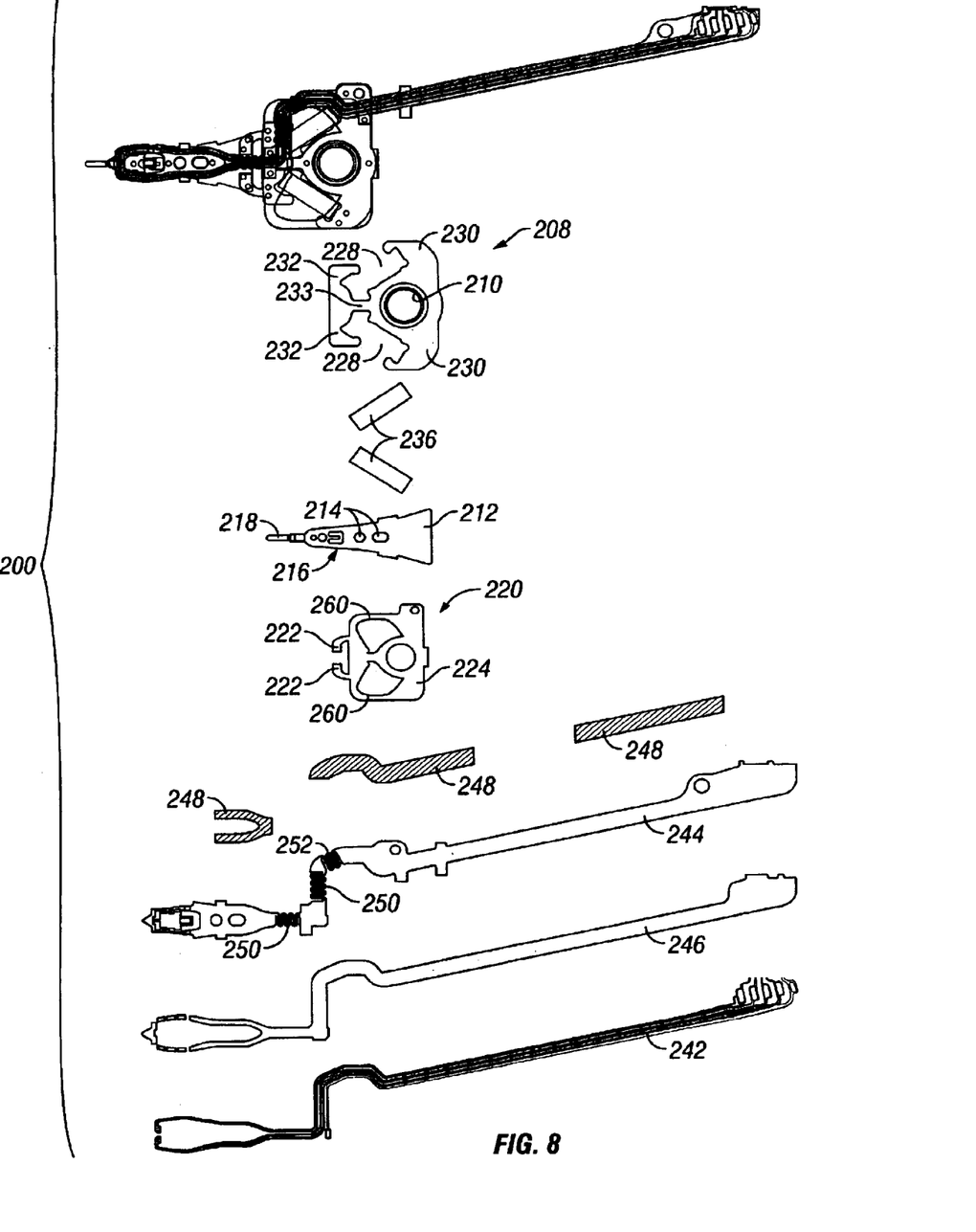
FIG. 8 is an exploded view showing components of the dual stage suspension assembly of FIG. 7.

Turning now to FIGS. 7 and 8, a suspension 200 is constructed in accordance with a second exemplary embodiment of the invention. The suspension 200 is similar in most respects to the suspension 100 described above and corresponding reference numerals (incremented by 100) are used to represent corresponding structure. The only difference between the suspension 100 and the suspension 200 is that the latter is provided with optional stiffener arms 260 (formed as part of the hinge plate member 220) in order to control rotational movement of the rotational elements 232. Although this tends to reduce the sway displacement of the slider, it provides added sway stiffening which may be desirable in order to obtain desired dynamic operating characteristics.

C. Third Exemplary Suspension Embodiment

Figure 9:
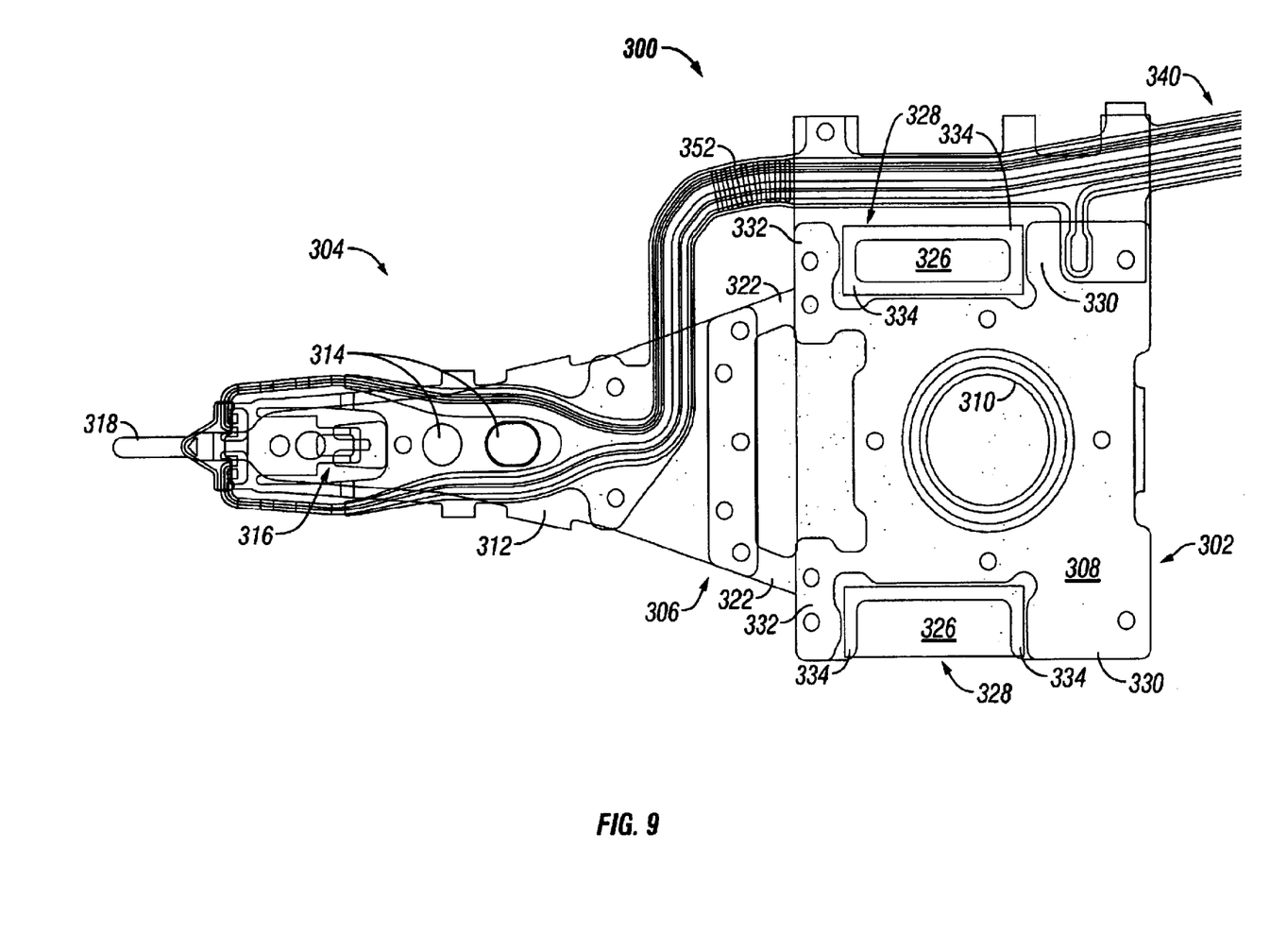
FIG. 9 is a plan view of a dual stage suspension assembly constructed in accordance with a third embodiment of the invention.
Figure 10:
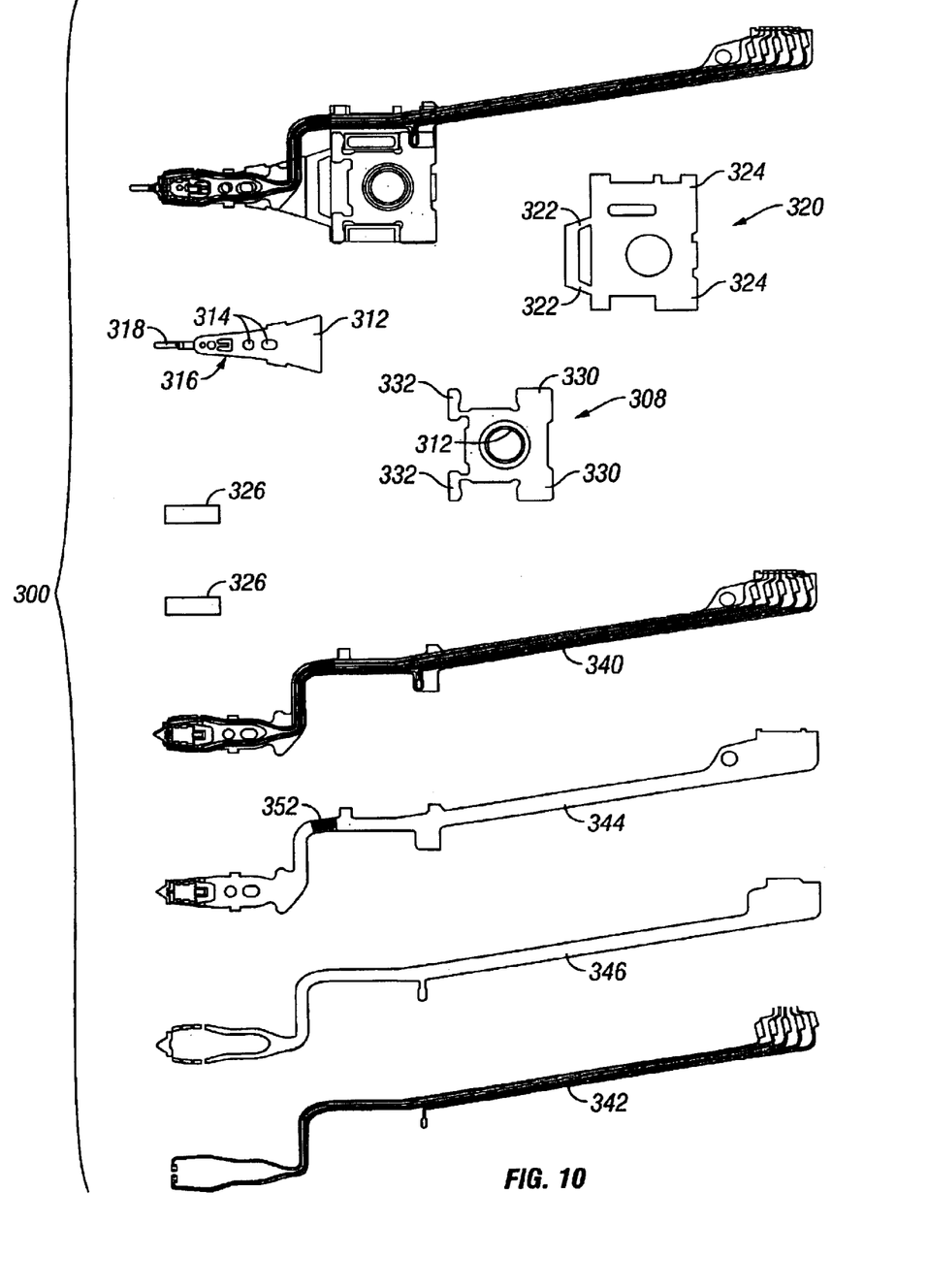
FIG. 10 is an exploded view showing components of the dual stage suspension assembly of FIG. 9.

Turning now to FIGS. 9 and 10, a suspension 300 is constructed in accordance with a third exemplary embodiment of the invention. The suspension 300 is similar in most respects to the suspension 100 described above and corresponding reference numerals (incremented by 200) are used to represent corresponding structure. The principal difference between the suspension 300 and the suspension 100 is that the actuators 326 are parallel to each other. In addition, the rotational elements 332 are more widely spaced and are placed at the edges of the mount plate 308. This configuration and the placement of the actuators 326 allow for a substantially square mount plate. The advantages of having a square mount plate are increased suspension sway frequency and a flatter mount plate as fabricated. A flatter mount plate will allow for better control of the overall flatness of a suspension, which will lead to lower wind flutter gain under airflow excitation. The attributes of the illustrated actuator placement are several. First, there are two separate and independent rotational elements 332 that the actuators 326 engage. Second, the electrical lead elements 342 are routed outside of the hinge beams 322 and do not go through the centerline of the suspension at the hinge 306.

D. Fourth Exemplary Suspension Embodiment

Figure 11:
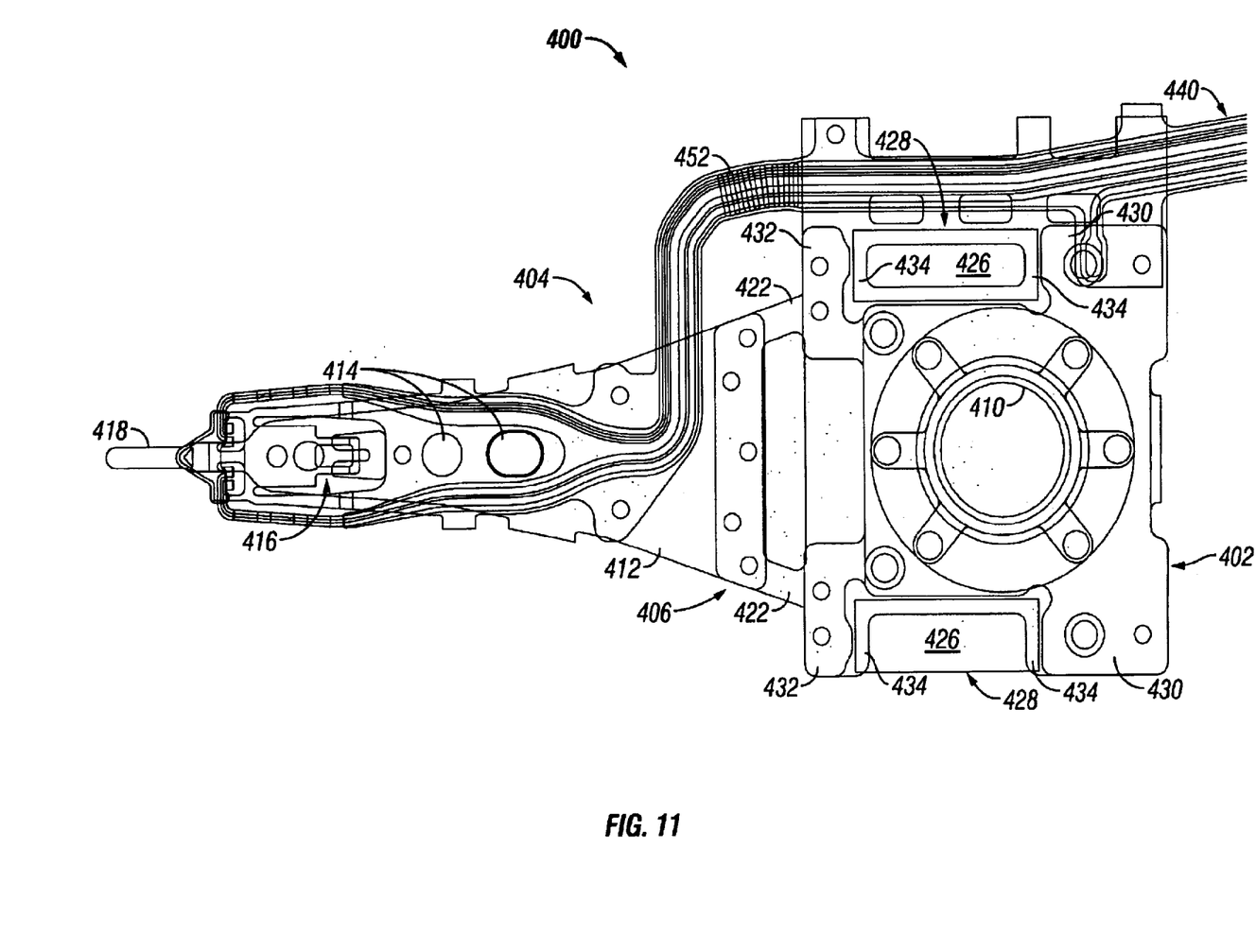
FIG. 11 is a plan view of a dual stage suspension assembly constructed in accordance with a fourth embodiment of the invention.
Figure 12:
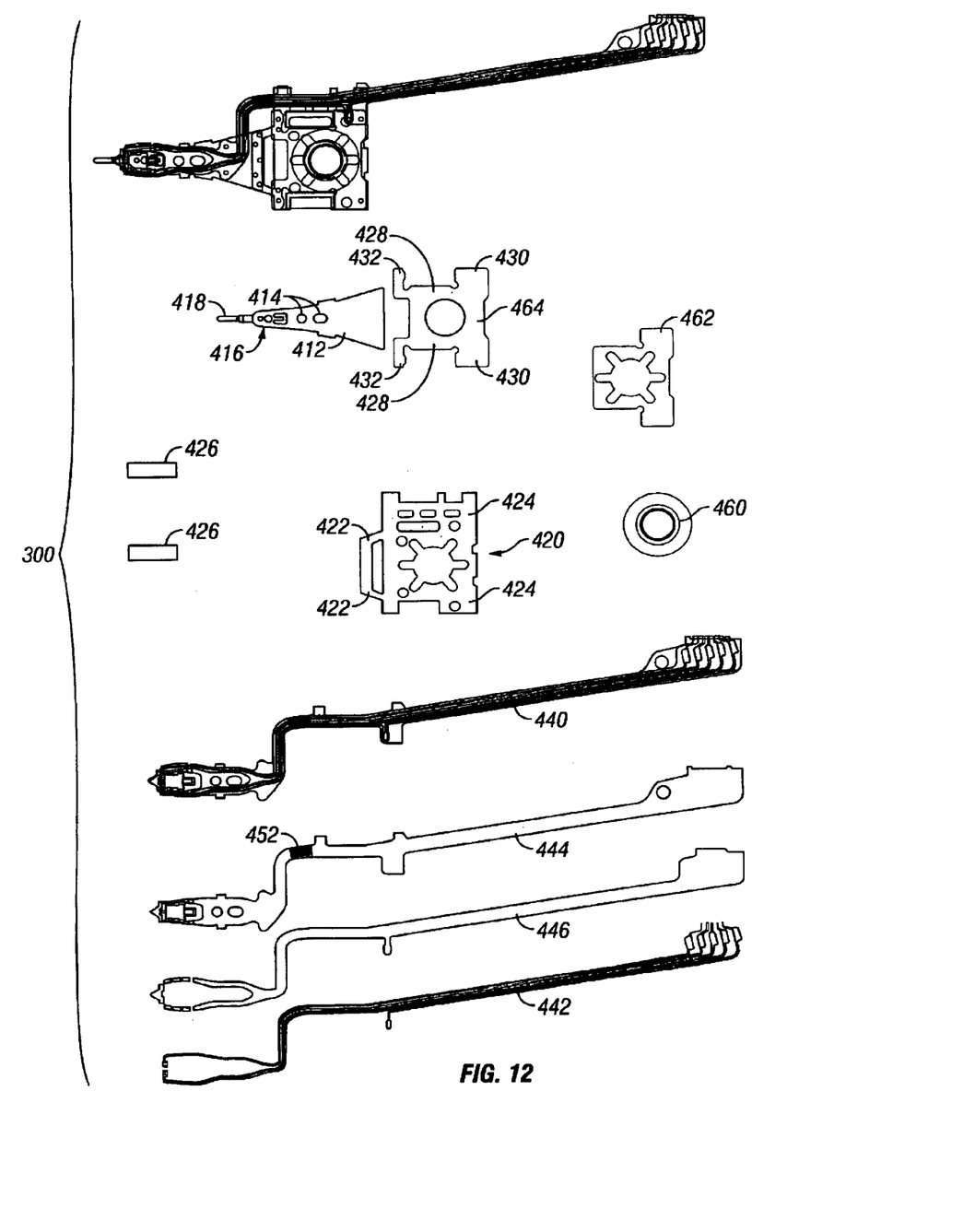
FIG. 12 is an exploded view showing components of the dual stage suspension assembly of FIG. 11.

Turning now to FIGS. 11 and 12, a suspension 400 is constructed in accordance with a fourth exemplary embodiment of the invention. The suspension 400 is similar in most respects to the suspension 100 described above and corresponding reference numerals (incremented by 300) are used to represent corresponding structure. The suspension 400 has a configuration that is substantially identical to that of the suspension 300. The only difference between the two suspensions is that the mount plate 402 of the suspension 400 is formed with a circular mount plate member 460. A circular mount plate member is easier to manufacture and also is easier to assemble into the suspension assembly 400. In order to utilize a circular shaped mount plate member and be able to protect and align the actuators 426, the load beam component 412 has an extended end portion 464. This extended end portion 464 has a pair of actuator receiving gaps 428 in which the actuators 426 are situated. The actuator receiving gaps 428 are each defined at one end by a static actuator support region 430 and at the other end by a rotational element 432 adapted to rotate in response to stroke displacements of one of the actuators 426. The static support regions 430 are designed to provide substantially immovable anchoring points for the actuators 426. The rotational elements 432 are designed to offer minimal resistance to actuator stroke. Because the extended load beam end portion 464 is part of the load beam 412, the material thickness thereof is thinner than required for actuator anchoring at the static support regions 430 and for protecting the actuators 426. To compensate for this thickness deficiency, a stiffener 462 is added. The stiffener 462 is shaped such that it will increase the thickness of the static support regions 430 but will not extend into the actuator receiving gaps 432. Because the stiffener 462 is an individual part, its thickness can be chosen to add to the thickness of the extended load beam end portion 464 and thereby build up the static support regions 430 and adequately protect the actuators 426. The stiffener 462 is also shaped so that it does not add material to the rotational elements 432, and these elements will thus remain compliant enough to offer minimal resistance to actuator stroke.

Accordingly, a dual stage suspension with PZT actuators has been disclosed. While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A disk drive having a suspension, said suspension comprising:
   a mount plate for mounting to an actuator arm;
   a functional end portion for carrying a slider;
   hinge beams disposed between said mount plate and said functional end portion;
   a mounting configuration on said mount plate for mounting said suspension to said actuator arm;
   a pair of actuator receiving gaps in said mount plate that are each defined at one end by a static actuator support region and at another end by a rotational element adapted to rotate under action of an actuator, each of said rotational elements having a free end operatively connected to one of said hinge beams;
   said actuator receiving gaps being in overlapping longitudinal relationship with said mounting configuration and being open between said static actuator support region and said rotational elements so as to allow said rotational elements to rotate about a central portion of said mount plate; and
   a pair of actuators arranged in said actuator receiving gaps so as to span said open portions thereof and in overlapping longitudinal relationship with said mounting configuration and operatively connected to said hinge beams, said actuators being adapted to produce sway displacement of said functional end portion.

2. A disk drive in accordance with claim 1 wherein said actuators are aligned in non-parallel relationship with each other.

3. A disk drive in accordance with claim 1 wherein said actuators are aligned in parallel relationship with each other.

4. A disk drive in accordance with claim 1 wherein said hinge beams comprise a pair of laterally spaced hinge beams extending between said mount plate and said functional end portion.

5. A disk drive in accordance with claim 1 wherein said suspension has an overall length of not more than 12.5 millimeters.

6. A disk drive in accordance with claim 1 further including a pair of stiffener arms connected to control rotational movement of said rotational elements.

7. A disk drive in accordance with claim 1 wherein said hinge beams comprise a stiffener portion in overlapping engagement with said mount plate and which extends beneath said actuator receiving gaps to support said actuators.

8. A disk drive in accordance with claim 7 wherein said mount plate comprises a single material sheet having a thickness sufficient to extend to a height of said actuators in said actuator receiving gaps, and further wherein said rotational elements are formed from said material sheet.

9. A disk drive in accordance with claim 7 wherein said mount plate comprises multiple material sheets collectively having a thickness sufficient to extend to a height of said actuators in said actuator receiving gaps, and further wherein said rotational elements are formed from one of said material sheets.

10. A disk drive in accordance with claim 9 wherein said multiple material sheets comprise a mount plate member, a stiffener member and a load beam extended end member made from a sheet material used to form a load beam sheet member of said functional end portion of said suspension, said rotational elements being formed from said load beam extended end member.

11. A disk drive in accordance with claim 1 wherein said suspension further includes electrical lead elements extending from said mount plate to said slider, said electrical lead elements spanning said hinge beams along a central longitudinal axis of said suspension.

12. A disk drive in accordance with claim 1 wherein said suspension further includes electrical lead elements and a lead supporting flexure structure extending from said mount plate to said slider, said flexure structure having a bend compliant configuration to reduce resistance to sway displacement of said functional end portion.

13. A disk drive in accordance with claim 1 wherein said suspension further includes electrical lead elements and a lead supporting flexure structure extending from said mount plate to said slider, said flexure structure having a section of adjustable length in an area that parallels one of said actuators to reduce resistance to actuator stroke displacement.

14. A disk drive having a suspension, said suspension comprising:
   a first end portion for mounting to an actuator arm;
   a second end portion for carrying a slider;
   bend-compliant means for providing a bend-compliant interconnection between said first end portion and said second end portion;
   suspension mounting means for mounting said first end portion to said actuator arm;
   a pair of actuator receiving means in said first end portion that are each defined at one end by a static actuator support region and at another end by a rotational element adapted to rotate under action of an actuator, each of said rotational elements having a free end operatively connected to said bend-compliant means;
   said actuator receiving means being in overlapping longitudinal relationship with said suspension mounting means and being open between said static actuator support region and said rotational elements so as to allow said rotational elements to rotate about a central portion of said first end portion; and
   actuation means arranged in said actuator receiving means so as to span said open portions thereof and in overlapping longitudinal relationship with said suspension mounting means for engaging said bend-compliant means and producing sway displacement of said second end portion.

15. A disk drive in accordance with claim 14 wherein said suspension has an overall length of not more than 12.5 millimeters.

16. A disk drive in accordance with claim 14 wherein said actuation means comprises dual actuators aligned in non-parallel relationship with each other.

17. A disk drive in accordance with claim 14 wherein said actuation means comprises dual actuators aligned in parallel relationship with each other.

18. A disk drive in accordance with claim 14 wherein said bend compliant means comprises a pair of laterally spaced hinge beams extending between said first end portion and said second end portion.

19. A disk drive in accordance with claim 14 wherein said suspension further includes electrical lead elements and a supporting flexure structure extending from said first end portion to said slider, said flexure structure having a section of adjustable length in an area that parallels said actuator means to reduce resistance to actuator means stroke displacement.

20. A disk drive in accordance with claim 14 further including a pair of stiffener arms connected to control rotational movement of said rotational elements.

21. A disk drive in accordance with claim 14 wherein said bend compliant means comprises stiffening means for stiffening said first end portion, said stiffener means being in overlapping engagement with said first end portion and extending beneath said actuator receiving means for supporting said actuator means.

22. A disk drive in accordance with claim 21 wherein said first end portion comprises a single material sheet having a thickness sufficient to extend to a height of said actuator means when said actuator means are received in said actuator receiving means.

23. A disk drive in accordance with claim 21 wherein said first end portion comprises multiple material sheets collectively having a thickness sufficient to extend to a height of said actuator means when said actuator means are received by said actuator receiving means, and further wherein said rotational elements are formed from one of said material sheets.

24. A disk drive in accordance with claim 23 wherein said multiple material sheets comprise a mount plate member, a stiffener member and a load beam extended end member made from a sheet material used to form a load beam sheet member of said second end portion of said suspension, said rotational elements being formed from said load beam extended end member.

25. A disk drive in accordance with claim 14 wherein said suspension further includes electrical lead elements extending from said first end portion to said slider, said electrical lead elements spanning said bend compliant means along a central longitudinal axis of said suspension.

26. A disk drive in accordance with claim 14 wherein said suspension further includes electrical lead elements and a supporting flexure structure extending from said first end portion to said slider, said flexure structure having a bend compliant configuration to reduce resistance to sway displacement of said second end portion.

27. A suspension for a disk drive, comprising:
a mount plate adapted to mount to a primary actuator;
a functional end portion adapted to carry a slider;
hinge beams disposed between said mount plate and said functional end portion;
a mounting configuration on said mount plate for mounting said suspension to said primary actuator;
a pair of actuator receiving gaps in said mount plate that are each defined at one end by a static actuator support region and at another end by a rotational element adapted to rotate under action of an actuator, each of said rotational elements having a free end operatively connected to one of said hinge beams;
said actuator receiving gaps being in overlapping longitudinal relationship with said mounting configuration and being open between said static actuator support region and said rotational elements so as to allow said rotational elements to rotate about a central portion of said mount plate; and
a pair of secondary actuators arranged in said actuator receiving gaps so as to span said open portions thereof and in longitudinally overlapping relationship with said mounting configuration and operatively connected to said hinge beams for producing sway displacement of said slider.

28. A suspension in accordance with claim 27 in combination with a disk drive.

* * * * *